United States Patent [19]
Thompson

[11] 3,861,421
[45] Jan. 21, 1975

[54] PINCH TUBE FAUCET
[75] Inventor: Arthur D. Thompson, London, Ontario, Canada
[73] Assignee: Emco Limited, London, England
[22] Filed: Jan. 11, 1974
[21] Appl. No.: 432,508

[52] U.S. Cl................................. 137/636.4, 251/9
[51] Int. Cl............................................ F16k 11/18
[58] Field of Search............ 251/4, 6, 7, 9; 137/607, 137/636.4

[56] References Cited
UNITED STATES PATENTS
| | | | |
|---|---|---|---|
| 3,172,426 | 3/1965 | Cole................................. | 137/636.4 |
| 3,774,643 | 11/1973 | Cole et al. ........................ | 137/636.4 |
| 3,805,842 | 4/1974 | Thompson et al................ | 137/636.4 |

FOREIGN PATENTS OR APPLICATIONS
| | | | |
|---|---|---|---|
| 240,423 | 8/1969 | U.S.S.R................................. | 251/9 |

*Primary Examiner*—Alan Cohan
*Assistant Examiner*—Richard Gerard
*Attorney, Agent, or Firm*—Fetherstonhaugh & Co.

[57] ABSTRACT
A mixing faucet which comprises a body; a first flow path in said body having an inlet end; a second flow path in said body having an inlet end, said first flow path and said second flow path merging with each other and continuing in an outlet flow path to an outlet; an elongated cam reciprocable and rotatable with respect to said body; two flexible tubes each forming a portion of one of said flow paths and being restrained against movement radially of the longitudinal axis of said cam with respect to said body and disposed on opposite sides of said cam; two levers, one for each of said tubes, each pivotally mounted to said body, said levers being on opposite sides of said cam surface, each of said levers being pivotable to engage with and compress its respective tube; two cam followers, one for each of said levers, each of said cam followers being pivotally mounted on its respective lever between the pivotal mounting of the lever and the point of engagement of the lever with its tube, said cam followers having a surface that makes a line of contact with the cam surface of said cam as said cam is moved longitudinally or rotatably with respect to said casing. The said cam has a cross-section for a portion of its extent adapted to cause said cam followers to move in opposite directions upon rotation whereby to pivot said levers and compress said flexible tubes to proportion flow through said first path and said second path. Said cam has a longitudinal cross-section to cause said cam followers to compress said tubes to control the volume of flow through said first flow path and said second flow path.

2 Claims, 4 Drawing Figures

PATENTED JAN 21 1975   3,861,421

PINCH TUBE FAUCET

This invention relates to a mixing faucet wherein the relative amount of hot and cold liquid flowing through the faucet is controlled by the rotation and translation of a rotatably and reciprocably mounted cam that functions to open and close passage through a pair of flexible tubes through which the liquid flows.

Faucets of this general type are known. U.S. Pat. No. 3,172,426, dated March 9, 1965, to George S. Cole is an example of a faucet of this type. In the Cole patent the cam engages directly with the flexible flow tubes and, because of the rounded and sloped nature of the cam surface, the diameter of the tubes and the cam must be maintained small to achieve a good shut off with a cam stroke of a practical length. Thus, for efficient operation, there is a limit to the size of tube that can be used, which in turn limits the capacity of the faucet. With the present invention a lever having a long straight contact surface for the tube is employed, which permits the use of tubes of larger cross-section.

Flexible flow tube faucets wherein the tubes are engaged by lever arms or shoes as a means of controlling flow are known and the invention does not relate to the use of a lever generally. U.S. Pat. No. 3,438,607, dated Apr. 15, 1969, to Williams, and U.K. Pat. No. 502,094, dated Sept. 10, 1938, to Cooper, are disclosures of this type. These latter arrangements overcome the difficulties of the limited contact area with the tube and limited capacity, but they cannot be conveniently used with the reciprocally and rotatably mounted cam of the type shown in Cole because of the nature of the cam surface. If the rounded cam surface like the one shown in the Cole patent is used to operate a lever by direct contact therewith, the cam and the lever of necessity make a point contact with each other. This is so because of the rounded and tapered nature of the cam. The lever must be rounded at its contact with the cam to accommodate the sloping portion of the cam. The contact between the two is a point contact and the unit stresses would be objectionably high. The lever of Williams or the shoe of Cooper cannot, therefore, be used with a cam like the one shown in Cole. It has not, therefore, prior to this invention been possible to increase the capacity of a faucet like the Cole faucet beyond the limitation permitted by the contact of the cam and the tube by using a lever to operate the tubes. This limitation is relatively low and a drawback to the extension of the use of the rotatable and reciprocable type cam in a pinch tube type faucet.

This invention overcomes this limitation of the reciprocable and rotatable cam in a pinch tube faucet and provides a construction wherein a tube of larger cross-section can be effectively closed with a lever without involving unduly high unit stresses where the cam contacts the cam follower.

The invention also provides smoother and lighter cam operation.

With the invention there is less tendency for the cam to creep to a more open position where it is partially open.

With the invention the cam stroke can be reduced.

With the invention there is no rubbing or dragging of the cam on the tube.

A mixing faucet according to this invention comprises a body, a first flow path in said body having an inlet end, a second flow path in said body having an inlet end, said first flow path and said second flow path merging with each other and continuing in an outlet flow path to an outlet, an elongated cam reciprocable and rotatable with respect to said body, two flexible tubes each forming a portion of one of said flow paths restrained against movement radially of the longitudinal axis of said cam with respect to said body and disposed on opposite sides of said cam, two levers, one for each of said tubes, each pivotally mounted on said body, said levers being on opposite sides of said cam surface, each of said levers being pivotable to engage with and compress its respective tube, two cam followers, one for each of said levers, each of said cam followers being pivotally mounted on its respective lever between the pivotal mounting of the lever and the point of engagement of the lever with its tube, said cam followers having a surface that makes a line contact with the cam surface of said cam as said cam is moved longitudinally or rotatably with respect to said casing, said cam having a cross-section for a portion of its extent adapted to cause said cam followers to move in opposite directions upon rotation whereby to pivot said levers and compress said flexible tubes to proportioned flow through said first path and said second path, said cam having a longitudinally cross-section adapted to cause said cam followers to compress said tubes upon reciprocation to control the volume of flow through said first flow path and said second flow path. The invention will be understood after reference to the following detailed specification read in conjunction with the drawings.

In the drawings:

FIG. 4 is a sectional illustration along the line 4—4 of FIG. 2.

Figure 1:
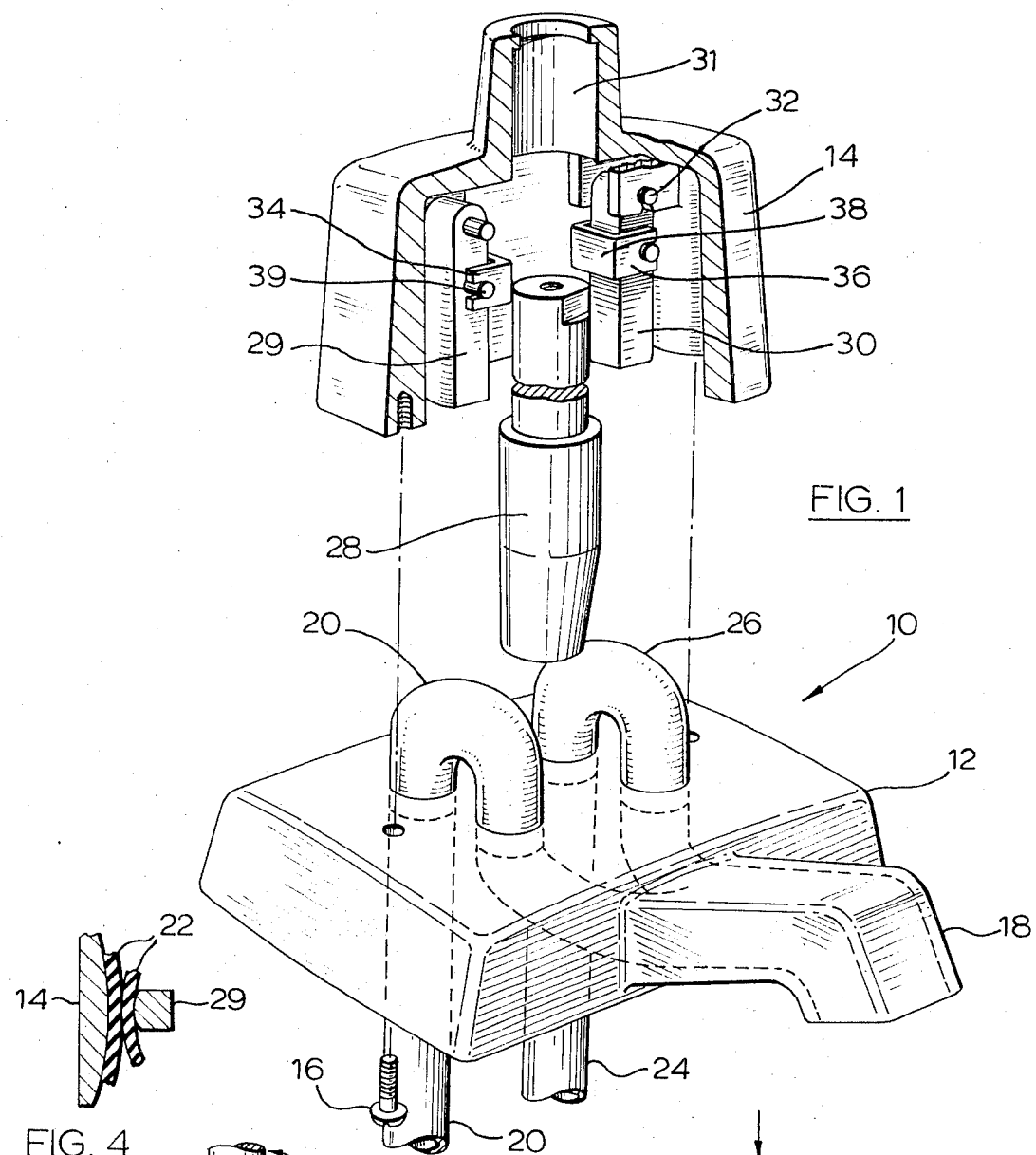
FIG. 1 is an exploded perspective illustration of a mixing faucet according to this invention.

The drawings illustrate a faucet according to the invention. It has a body, generally indicated by the numeral 10, which has a base 12 and tube housing 14 which is secured to the base by bolts 16. The base and housing are preferably made from a plastics material. There are two flow paths through the body that merge in outlet spout 18. The first flow path has an inlet 20 and extends upwardly through U-shaped flexible rubber tube 22 to the outlet spout 18. The second flow path has an inlet 24 and extends upwardly through U-shaped flexible rubber tube 26 and then enters with the outlet spout 18.

One of the flow paths is connected to a hot water supply and the other is connected to a cold water supply in use, and the flow through the faucet to the outlet spout is controlled as to volume and temperature by manipulating the tapered cam member 28. Cam 28 is round in cross-section and has the general configuration of the cam shown in the above noted Cole patent. No claim to the novelty of the cam configuration per se is made in this specification. Cam 28 is mounted for reciprocation and rotation in bearing 31 of the housing 14 of the body to close or open the flexible tube portions of the flow paths, as will be referred to later. An operating handle (not illustrated) is secured to the top of cam 28.

Figure 2:
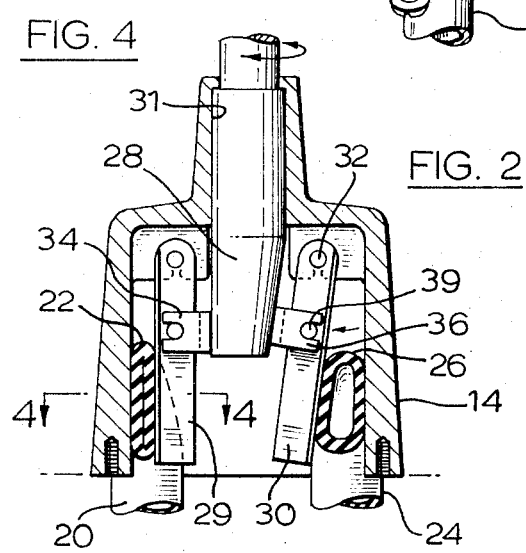
FIG. 2 is a sectional view of the faucet illustrating the position of the cam with one pinch tube closed and the other open.

Cam 28 is mounted for movement of translation and rotation within the casing. It can be slid in a vertical direction from the position illustrated in FIG. 2 where there is a maximum total flow volume for that particular rotational position of the cam to the position of FIG. 3 where there is no flow. By rotating the cam in any position except a no flow position, one can vary the relative amounts of water that flow through each of the flow paths. In FIG. 2 tube 26 is fully open and tube 22 is fully closed. If flow path 26 conducts cold water and flow path 22 conducts hot water, the output temperature would be a minimum. The round cross-section on the cam surface is such that by rotating the cam, tube 26 is caused to be gradually compressed and tube 22 is gradually permitted to open to achieve a mixing at the outlet 18 and a higher temperature. At the position of rotation that tube 26 is fully closed, tube 22 is fully open and the output water is of maximum temperature.

The operation of the cam to achieve adjustment of flow through the pinch tube is not new and is described in Cole Pat. No. 3,172,426 noted above. It is not described in detail in this specification.

In this faucet the flexible tubes 22 and 26 are compressed by means of levers 29 and 30, which have pins 32 that are pivotally mounted between opposed lugs at the upper portion of the housing 14 of the body, as indicated.

Figure 3:
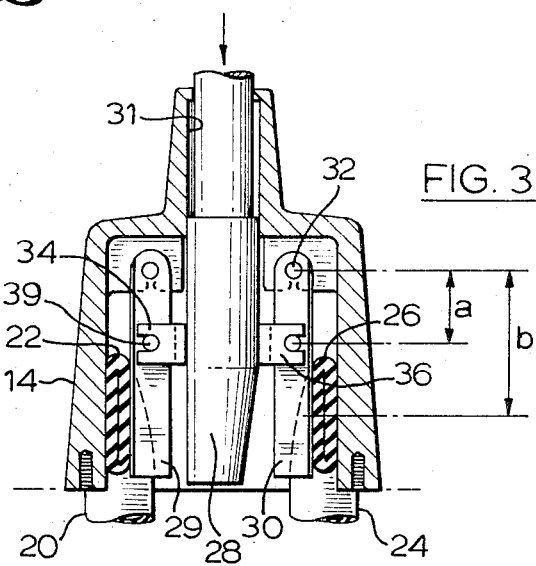
FIG. 3 is a sectional illustration similar to FIG. 2 but showing both pinch tubes closed.

The levers 29 and 30 each pivotally connect with a cam follower 34 and 36 respectively. In this connection it will be noted that each of the levers carries a pin and the bifurcated legs of each of the cam followers 34 and 36 fit over and rotate about the pin. The cam surface 38 of each of the cam followers 34 and 36 has a vertical extent and makes a line contact with the cam surface of the cam 28, as indicated in FIGS. 2 and 3. Thus, in operation as the cam 28 is rotated and/or reciprocated within the housing 14 of the body, the cam followers 34 and 36 pivot as required on their pivot pins to make a line contact with the cam for various positions of the cam as the cam is raised and/or lowered and/or rotated.

The flexible tubes 22 and 26 are each compressed between the wall of the housing 14 and the outer surface of their respective lever, as shown in FIG. 4 from which it will be noted that the cooperating surfaces are each convex. By appropriate manipulation of the cam 28 one can achieve any degree of mixing between the inputs to the flow paths 20 and 24 and any volume of flow between full open and closed.

Thus and as noted above, in the position of FIG. 2 with the cam 28 reciprocated to its most upward position and rotated to force pinch tube 22 to a closed position and permit flexible tube 26 to assume its most open position, there would be substantially full flow between flow path 24 and no flow through flow path 20. By depressing the cam without rotation one would gradually close tube 26 as lever 30 is pivoted about its pivot point 32 until the fully closed position is reached, as illustrated in FIG. 3.

If instead of reciprocating the cam 28 from the position illustrated in FIG. 2, one were to rotate it, one would pivot the levers 29 and 30 about their respective pivot points to compress tube 26 and permit tube 22 to open in response to the water pressure within it. The output spout would contain a mixture of hot and cold water. A rotation of 180° would fully close flexible tube 26 and fully open flexible tube 22.

Also as already noted, the type of cam illustrated is well known and no claim is being made to the functioning of the cam. This invention is concerned with the lever arrangement and with the cam followers 34 and 36, which pivotally engage with their respective levers. There are substantial advantages arising out of the lever and cam follower arrangement of this invention. The levers 29 and 30 are designed such that the faces thereof that engage with the flexible tubes 22 and 26 are substantially parallel to the reaction surfaces of the housing when the flexible tubes are in a closed position, as illustrated in FIG. 3. Thus, it is possible to obtain a secure closure for a flexible tube having large as well as small diameter. It is not possible to achieve closure of larger diameter tubes with the arrangement illustrated in the Cole patent because there is a limit to the diameter of a tube that can be effectively closed off with a practical cam stroke length. With the present invention there is no practical limit to the capacity of the faucet resulting from the type of closure achieved on the flexible tubes.

With the present invention it is possible to close a large diameter tube without increasing the cam stroke length because the tube is closed between the long straight surfaces of the levers whose design is independent of the cam stroke.

There is a favourable mechanical advantage achieved with the lever operation. It will be noted that the cam followers 34 and 36 pivot about pivot pins 39 on the lever at a point between the pivot axis 32 and the mid-point of engagement of the levers with the flexible tubes. With such an arrangement the closing action of the cam on the tubes is magnified; thus, for a given tube closure the taper on the cam 28 can be more shallow than in the case where no lever is used. This results in a smoother and lighter operation. It has been found that a practical faucet can be made with a cam having a taper of about 4° 30''. A similar faucet, but constructed with the cam in direct contact with the tubes, would have a cam taper of about 6° 30'' and a longer stroke.

The preferred ratio for the distance $a$ between the pivot axes 39 and 32 to the distance $b$ between pivot axis 32 and the mid-point of contact of the lever with the surface of the tube is about 1:2.

Embodiments of the invention other than the one illustrated will be apparent to those skilled in the art and it is not intended that the invention should be restricted to the foregoing specific embodiment.

What I claim as my invention is:

1. A mixing faucet comprising
   a body,
   a first flow path in said body having an inlet end,
   a second flow path in said body having an inlet end,
   said first flow path and said second flow path merging with each other and continuing in an outlet flow path to an outlet,
   an elongated cam reciprocable and rotatable with respect to said body,
   two flexible tubes each forming a portion of one of said flow paths, and being restrained against movement radially of the longitudinal axis of said cam with respect to said body and disposed on opposite sides of said cam,
   two levers, one for each of said tubes, each pivotally mounted to said body, said levers being on opposite sides of said cam surface, each of said levers being pivotable to engage with and compress its respective tube, two cam followers, one for each of said levers, each of said cam followers being pivotally mounted on its respective lever between the pivotal mounting of the lever and the point of engagement of the lever with its tube, said cam followers having a surface that makes a line of contact with the cam surface of said cam as said cam is moved longitudinally or rotatably with respect to said casing, said cam having a cross-section for a portion of its extent adapted to cause said cam followers to move in opposite directions upon rotation whereby to pivot said levers and compress said flexible tubes to proportion flow through said first path and said second path, said cam having a longitudinal cross-section to cause said cam followers to compress said tubes to control the volume of flow through said first flow path and said second flow path.

2. A mixing faucet as claimed in claim 1 in which said cam followers are pivotally mounted on their respective levers as aforesaid about mid-way between the pivotal mounting of the lever and the point engagement of the lever with its tube.

* * * * *

UNITED STATES PATENT OFFICE
CERTIFICATE OF CORRECTION

Patent No. 3,861,421  Dated January 21, 1975

Inventor(s) Arthur D. Thompson

It is certified that error appears in the above-identified patent and that said Letters Patent are hereby corrected as shown below:

The Assignee should read -- Emco Limited, London, Ontario, Canada --.

Signed and Sealed this twenty-first Day of October 1975

[SEAL]

Attest:

RUTH C. MASON  
*Attesting Officer*

C. MARSHALL DANN  
*Commissioner of Patents and Trademarks*